US009423931B2

(12) United States Patent
Shimadate (10) Patent No.: US 9,423,931 B2
(45) Date of Patent: Aug. 23, 2016

(54) THUMBNAIL DISPLAY APPARATUS, THUMBNAIL DISPLAY METHOD, AND COMPUTER READABLE MEDIUM FOR SWITCHING DISPLAYED IMAGES (71) Applicant: FUJI XEROX CO., LTD., Minato-ku, Tokyo (JP)

(72) Inventor: Kiyoko Shimadate, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 522 days.

(21) Appl. No.: 13/669,760

(22) Filed: Nov. 6, 2012

(65) Prior Publication Data

US 2013/0311949 A1 Nov. 21, 2013

(30) Foreign Application Priority Data

May 15, 2012 (JP) .................................. 2012-111528

(51) Int. Cl.
*G06F 3/01* (2006.01)
*G06F 3/0483* (2013.01)
*G06F 3/0488* (2013.01)
*G06F 3/0481* (2013.01)
*G06F 3/0484* (2013.01)

(52) U.S. Cl.
CPC .......... *G06F 3/0483* (2013.01); *G06F 3/04817* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| 5,249,296 | A | * | 9/1993 | Tanaka | 715/799 |
| 5,900,876 | A | * | 5/1999 | Yagita | G06F 3/0483 715/776 |
| 6,324,555 | B1 | * | 11/2001 | Sites | 715/234 |
| 7,081,882 | B2 | * | 7/2006 | Sowden et al. | 345/156 |
| 7,559,037 | B2 | * | 7/2009 | Keely et al. | 715/834 |

(Continued)

FOREIGN PATENT DOCUMENTS

| JP | 2003-140802 A | 5/2003 |
| JP | 2010-049475 A | 3/2010 |

(Continued)

OTHER PUBLICATIONS

Communication dated Jan. 19, 2016 from the Japanese Patent Office issued in corresponding Application No. 2012-111528.

*Primary Examiner* — Jeffrey A Gaffin
*Assistant Examiner* — Nhat-Huy T Nguyen
(74) *Attorney, Agent, or Firm* — Sughrue Mion, PLLC (57) ABSTRACT A thumbnail display apparatus includes a display that displays, one by one, thumbnail images corresponding to plural pages included in a document, the thumbnail images being generated by reducing images of the corresponding pages included in the document to a predetermined size, a detecting unit that detects a sliding operation of an object, the sliding operation being performed when the thumbnail image displayed by the display being touched by the object, and a controller that performs, in response to detection of the sliding operation by the detecting unit, page switching so as to sequentially switch the page of the document whose thumbnail image is being displayed by the display to other pages.

16 Claims, 8 Drawing Sheets

(56) References Cited

U.S. PATENT DOCUMENTS

| | | | |
|---|---|---|---|
| 2006/0055662 A1* | 3/2006 | Rimas-Ribikauskas | G06F 3/017 345/156 |
| 2007/0083828 A1* | 4/2007 | Toriyama et al. | 715/816 |
| 2008/0268932 A1* | 10/2008 | Nagano | 463/11 |
| 2011/0145733 A1* | 6/2011 | Neitz | G06F 3/0486 715/761 |
| 2011/0252372 A1* | 10/2011 | Chaudhri | G06F 3/04817 715/835 |
| 2012/0136892 A1* | 5/2012 | Ajima | 707/769 |
| 2012/0240075 A1* | 9/2012 | Kim | G06F 3/0481 715/776 |
| 2013/0127912 A1* | 5/2013 | Lin | 345/659 |
| 2013/0212523 A1* | 8/2013 | Shibata | 715/784 |

FOREIGN PATENT DOCUMENTS

| | | |
|---|---|---|
| JP | 2010-128518 A | 6/2010 |
| JP | 2010-204891 A | 9/2010 |
| JP | 2012-8644 A | 1/2012 |
| WO | 2012/039054 A1 | 3/2012 |

* cited by examiner

THUMBNAIL DISPLAY APPARATUS, THUMBNAIL DISPLAY METHOD, AND COMPUTER READABLE MEDIUM FOR SWITCHING DISPLAYED IMAGES

CROSS-REFERENCE TO RELATED APPLICATIONS

This application is based on and claims priority under 35 USC 119 from Japanese Patent Application No. 2012-111528 filed May 15, 2012.

BACKGROUND (i) Technical Field

The present invention relates to a thumbnail display apparatus, a thumbnail display method, and a computer readable medium.

(ii) Related Art

As one way of allowing a user to identify electronic documents (hereinafter simply referred to as "documents") managed by a computer, thumbnail images of the respective documents may be displayed on a display panel. Such a thumbnail image is usually an image of the first page of the document reduced to a predetermined size. In this case, the user sees the thumbnail images so as to recognize the first pages of the documents represented by the thumbnail images and thus to identify the documents.

SUMMARY

According to an aspect of the invention, there is provided a thumbnail display apparatus that includes a display that displays, one by one, thumbnail images corresponding to plural pages included in a document, the thumbnail images being generated by reducing images of the corresponding pages included in the document to a predetermined size, a detecting unit that detects a sliding operation of an object, the sliding operation being performed when the thumbnail image displayed by the display is being touched by the object, and a controller that performs, in response to detection of the sliding operation by the detecting unit, page switching so as to sequentially switch the page of the document whose thumbnail image is being displayed by the display to other pages.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the accompanying drawings.

In the following, a description will be given of a thumbnail display apparatus according to an exemplary embodiment of the present invention, which is provided in a multifunctional machine having multiple functions such as printing, copying and faxing of documents.

Figure 1:
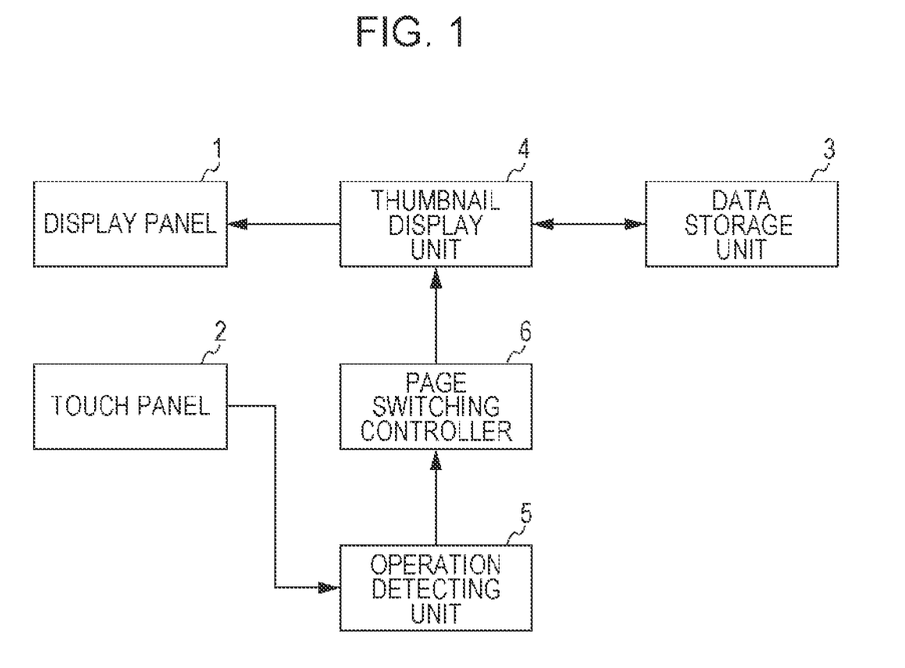
FIG. 1 is an exemplary functional block diagram of a thumbnail display apparatus according to an exemplary embodiment of the present invention.

FIG. 1 is an exemplary functional block diagram of the thumbnail display apparatus according to the exemplary embodiment of the present invention.

The thumbnail display apparatus according to the present exemplary embodiment includes functional units such as a display panel 1, a touch panel 2, a data storage unit 3, a thumbnail display unit 4, an operation detecting unit 5, and a page switching controller 6.

The display panel 1 is a planar panel that displays various types of information. Exemplary embodiments of the display panel 1 may include a liquid crystal panel.

The touch panel 2 is a planar transparent panel disposed on a display surface of the display panel 1, and has a function of detecting a touch position (i.e., a contact position of an object) and outputs a signal indicating the touch position. The touch panel 2 may be of any of various touch panels using different operation principles such as a resistive type and an electrostatic capacitance type.

The data storage unit 3 stores data of documents that are identified by identification information of the documents (e.g., document names). The data of the documents may include data having a structure that holds, on a per page basis, information of elements of the page content of each document, such as text, graphics, and pictures, for example.

Further, the data storage unit 3 stores, in association with the data of each document, a thumbnail image of each page of the document. The thumbnail image is an image representing the content of each page and is reduced to a predetermined size (e.g., a size that fits within 90 pixels wide by 90 pixels high). Various methods may be used for associating the thumbnail image with the data of the document. For example, identification information of the document may be attached to the thumbnail image, or the thumbnail image may be included in the data of the document.

The thumbnail display unit 4 causes the display panel 1 to display thumbnail images of plural documents stored in the data storage unit 3. The thumbnail images are displayed in the manner illustrated in FIG. 3 and other drawings, for example. More specifically, thumbnail images of single pages of the respective documents are displayed in a matrix form. The page to be displayed is the first page of the document in the initial state, and is sequentially switched to the following pages by page switching control described below.

The operation detecting unit 5 detects a touch operation performed by the user on the content displayed on the display panel 1 on the basis of a signal of a touch position output from the touch panel 2.

The page switching controller 6 performs page switching control in response to detection of a specific user operation by the operation detecting unit 5. The specific user operation is a sliding operation which is performed when the thumbnail image displayed on the display panel 1 is in a touched state. Here, "the display panel 1 is in a touched state" may mean that an object is touching the display panel 1. Further, under the page switching control, the page of the document whose thumbnail image is to be displayed on the display panel 1 is sequentially switched to the other pages. These operations will be described in detail in the following Exemplary Embodiments.

(Exemplary Embodiment 1)

In Exemplary Embodiment 1, page switching control is performed in response to detection of a sliding operation, which is performed when the thumbnail image is in a touched state, to an area outside of the thumbnail image.

Figure 2:
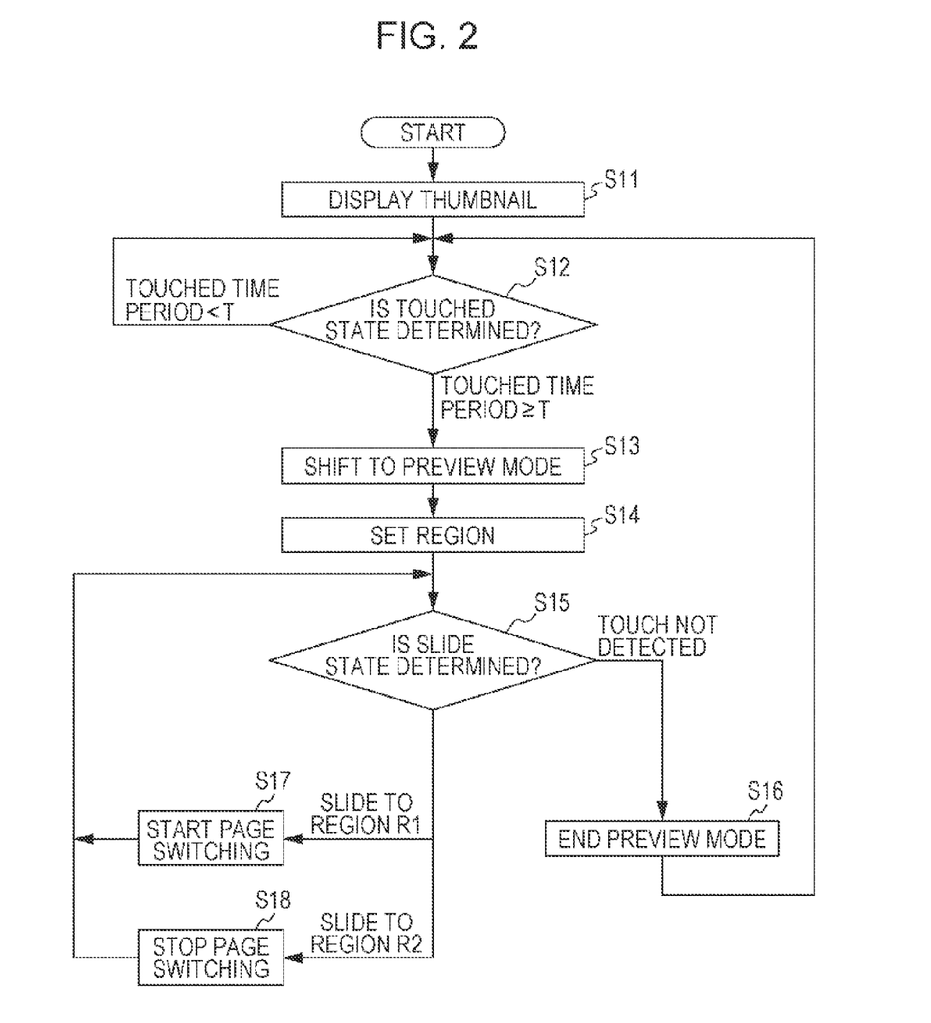
FIG. 2 is an exemplary flowchart according to Exemplary Embodiment 1.
Figure 3:
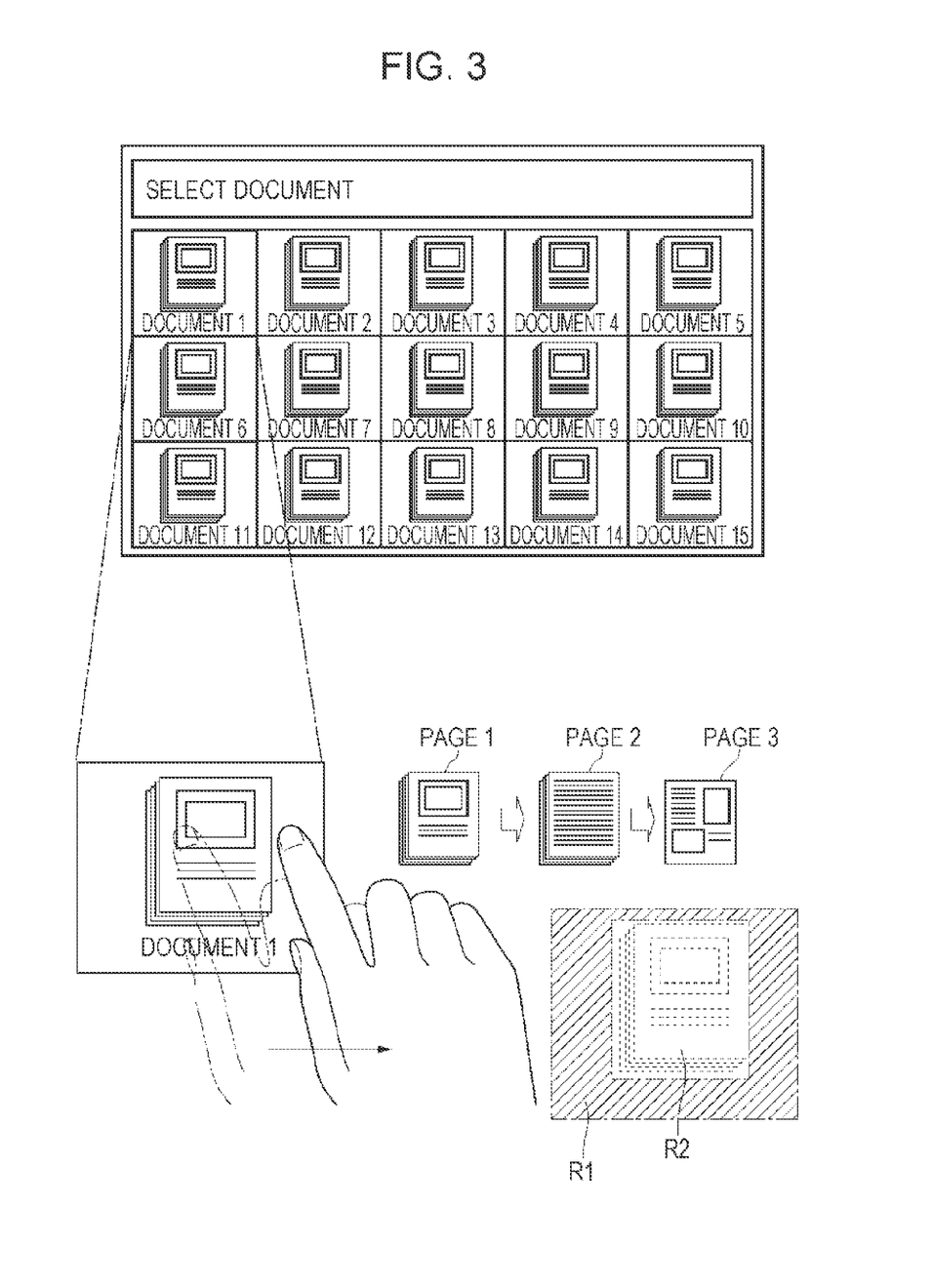
FIG. 3 is a diagram illustrating an example of page switching control according to Exemplary Embodiment 1.

FIG. 2 illustrates an exemplary flowchart according to Exemplary Embodiment 1. Further, FIG. 3 illustrates an example of page switching control according to Exemplary Embodiment 1.

First, the thumbnail display unit 4 causes the display panel 1 to display thumbnail images of plural documents (Step S11). Since the process is in an initial state at this point, thumbnail images of first pages of the respective documents are displayed.

In the initial state, if the user touches the displayed thumbnail image, a signal indicating a touch position is output from the touch panel 2. On the basis of this signal, the operation detecting unit 5 determines a touched state of the displayed thumbnail image (Step S12).

Then, if the duration of the touched state of the displayed thumbnail image (i.e., the touched time period) becomes equal to or longer than a threshold time period T, the display is shifted to a preview mode of the document corresponding to the thumbnail image (Step S13).

In response to the shift to the preview mode, the page switching controller 6 first sets an area other than the display area of the touched thumbnail image (i.e., an area outside the touched thumbnail image) as a region R1 to be used as a reference for issuing an instruction for starting page switching control, and sets an area inside the display area of the touched thumbnail image as a region R2 to be used as a reference for issuing an instruction for stopping page switching control (Step S14).

Subsequently, in the preview mode, the operation detecting unit 5 detects a sliding operation which is performed while the displayed thumbnail image is in the touched state (Step S15).

Then, if a sliding operation to the region R1 is detected, the page switching controller 6 starts page switching control (Step S17). That is, as illustrated in FIG. 3, with respect to the document to be subjected to page switching (i.e., the document whose thumbnail image is touched), the page whose thumbnail image is to be displayed is automatically sequentially switched, at predetermined time intervals, in this order: page 1 (i.e., the first page), page 2, page 3, and so on.

If a sliding operation to the region R2 is detected after the page switching control is started, the page switching control is temporarily suspended by the page switching controller 6 (Step S18). After that, if another sliding operation to the region R1 is detected, the page switching controller 6 restarts page switching control (Step S17).

On the other hand, if the touched state is no longer detected (i.e., if the finger of the user or the like is removed from the touch panel 2), the preview mode is ended (Step S16) so as to return to the initial state.

It is to be noted that, according to the page switching control according to the present exemplary embodiment, the interval (i.e., the time interval) of page switching is made to change in accordance with a sliding distance of the sliding operation from the boundary of the thumbnail image (i.e., the boundary between the region R1 and the region R2). More specifically, the time interval of page switching increases as the sliding distance of the sliding operation from the boundary of the thumbnail image decreases (in other words, the time interval of page switching decreases as the sliding distance of the sliding operation from the boundary of the thumbnail image increases).

(Exemplary Embodiment 2)

In Exemplary Embodiment 2, page switching control is performed in response to detection of a sliding operation which is performed when the displayed thumbnail image is in the touched state and in which a sliding distance is equal to or greater than a threshold. In the following, a description of features that are the same as those in Exemplary Embodiment 1 will be omitted, and only the differences will be described.

Figure 4:
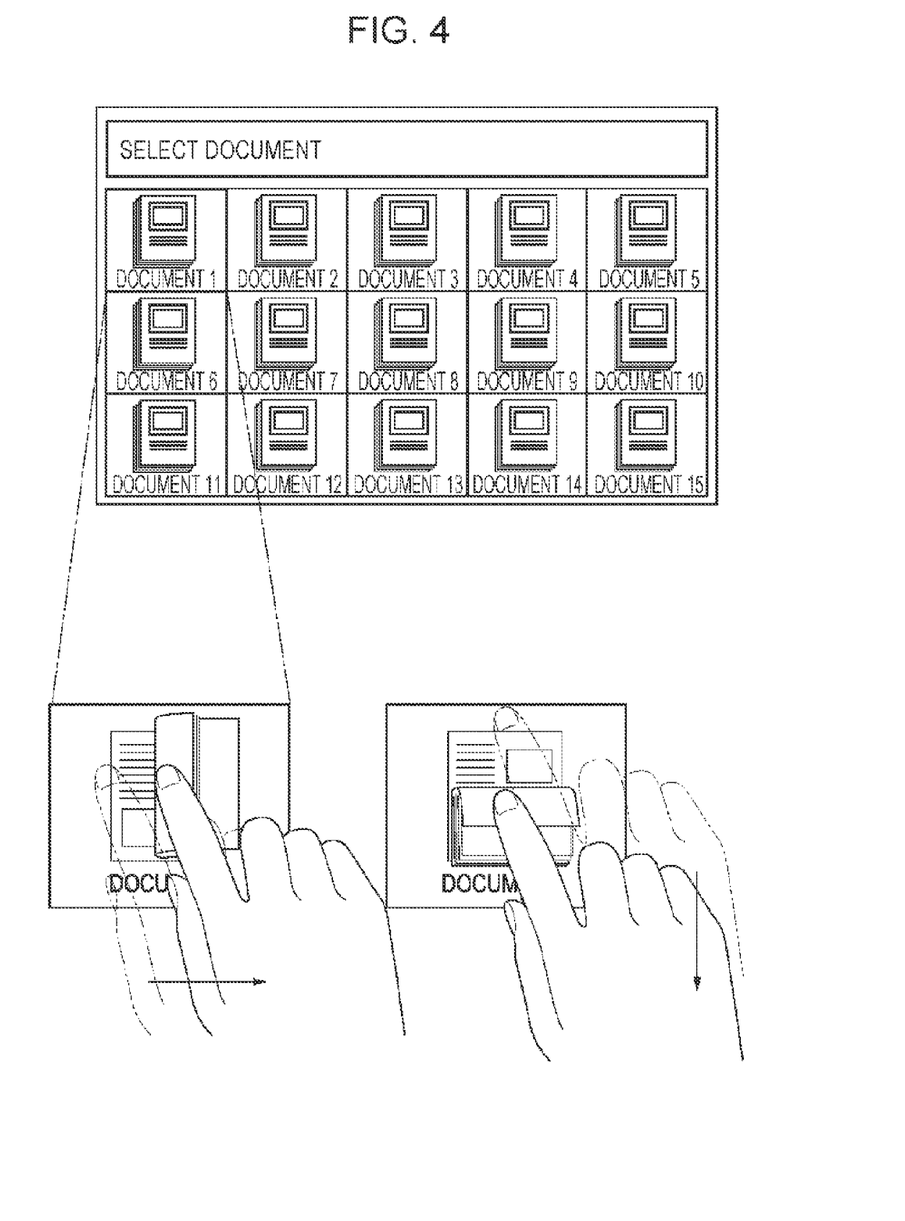
FIG. 4 is a diagram illustrating examples of page switching control according to Exemplary Embodiment 2.

FIG. 4 illustrates examples of page switching control according to Exemplary Embodiment 2.

In the examples illustrated in FIG. 4, in the case of a rightward sliding operation that is performed when a left edge of the thumbnail image is in a touched state, if the sliding distance becomes equal to or greater than a threshold (e.g., a distance half the width of the thumbnail image), page switching control is performed. Further, in the case of a downward sliding operation that is performed when an upper edge of the thumbnail image is in a touched state, if the sliding distance becomes equal to or greater than a threshold (e.g., a distance half the height of the thumbnail image), page switching control is performed. That is, the sliding operation that triggers page switching control is different from that of Exemplary Embodiment 1.

It is to be noted that the direction of the sliding operation is not limited to the directions described above. The page switching control may be performed in response to a leftward sliding operation that is performed when a right edge of the thumbnail image is in a touched state, or in response to an upward sliding operation that is performed when a lower edge of the thumbnail image is in a touched state.

Further, the value of the threshold may be any value, and may be determined by taking into consideration the area of the thumbnail image to be hidden by the finger or the like. The threshold may have a value that provides a certain size of area visible by the user.

In Exemplary Embodiment 1, the pages of the thumbnail images are simply sequentially switched. On the other hand, in Exemplary Embodiment 2, as illustrated in FIG. 4, not only a part of the thumbnail image of the page to be displayed is displayed, but also a thumbnail image of the page preceding the page to be displayed is displayed in a manner such that a part of the preceding page is folded back.

Further, the thumbnail image of the preceding page is displayed in a manner such that an image portion thereof in a direction opposite to a direction of the sliding operation is folded back in the direction of the sliding operation. That is, for example, in the case of a rightward sliding operation, the thumbnail image is displayed in a manner such that a left-side image portion thereof is folded rightward. Further, in the case of a downward sliding operation, the thumbnail image is displayed in a manner such that an upper-side image portion thereof is folded downward.

Further, the interval (i.e., the time interval) of page switching is made to change in accordance with the sliding distance of the sliding operation from the touch position on the thumbnail image (i.e., the distance from the original touch position to the touch position after the sliding operation). More specifically, the time interval of page switching increases as the sliding distance of the sliding operation from the touch position on the thumbnail image decreases (in other words, the time interval of page switching decreases as the sliding distance of the sliding operation from the touch position on the thumbnail image increases).

(Exemplary Embodiment 3)

Exemplary Embodiment 3 is a modification of Exemplary Embodiment 2. In Exemplary Embodiment 3, the display position of the thumbnail image of the page to be displayed in page switching control is shifted. In the following, a description of features that are the same as those in Exemplary Embodiment 2 will be omitted, and only the differences will be described.

Figure 5:
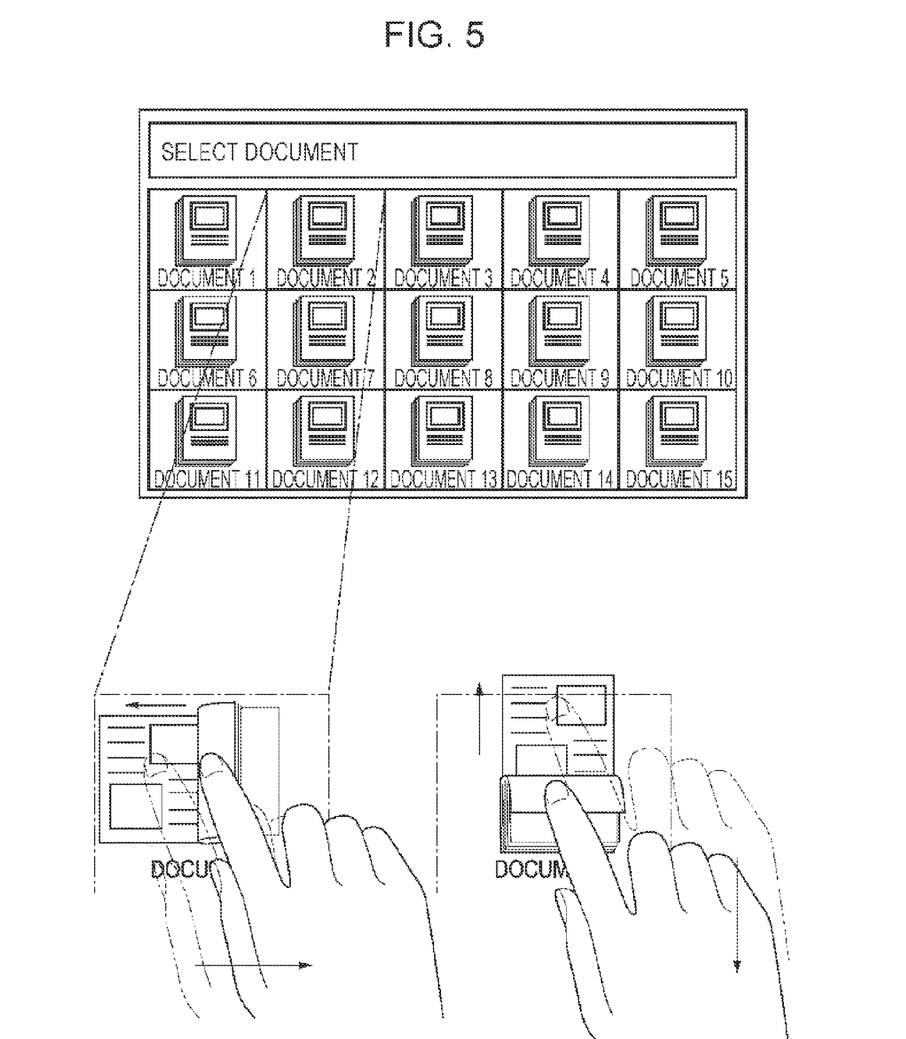
FIG. 5 is a diagram illustrating examples of shifted display in page switching control according to Exemplary Embodiment 3.

FIG. 5 illustrates examples of shifted display in page switching control according to Exemplary Embodiment 3.

In the examples illustrated in FIG. 5, in the case of a rightward sliding operation that is performed when a left edge of the thumbnail image is in a touched state, the thumbnail image to be displayed is shifted leftward. Further, in the case of a downward sliding operation that is performed when an upper edge of the thumbnail image is in a touched state, the thumbnail image to be displayed is shifted upward. That is, in Exemplary Embodiment 3, the thumbnail image to be displayed is displayed in a position shifted in a direction opposite to the direction of the sliding operation.

It is to be noted that the distance of shifting the thumbnail image to be displayed may be any distance. The thumbnail image may be shifted until the entire thumbnail image is displayed. That is, for example, a touch position by the finger or the like may be identified, and the thumbnail image may be shifted until the thumbnail image does not overlap the touch position.

Figure 6:
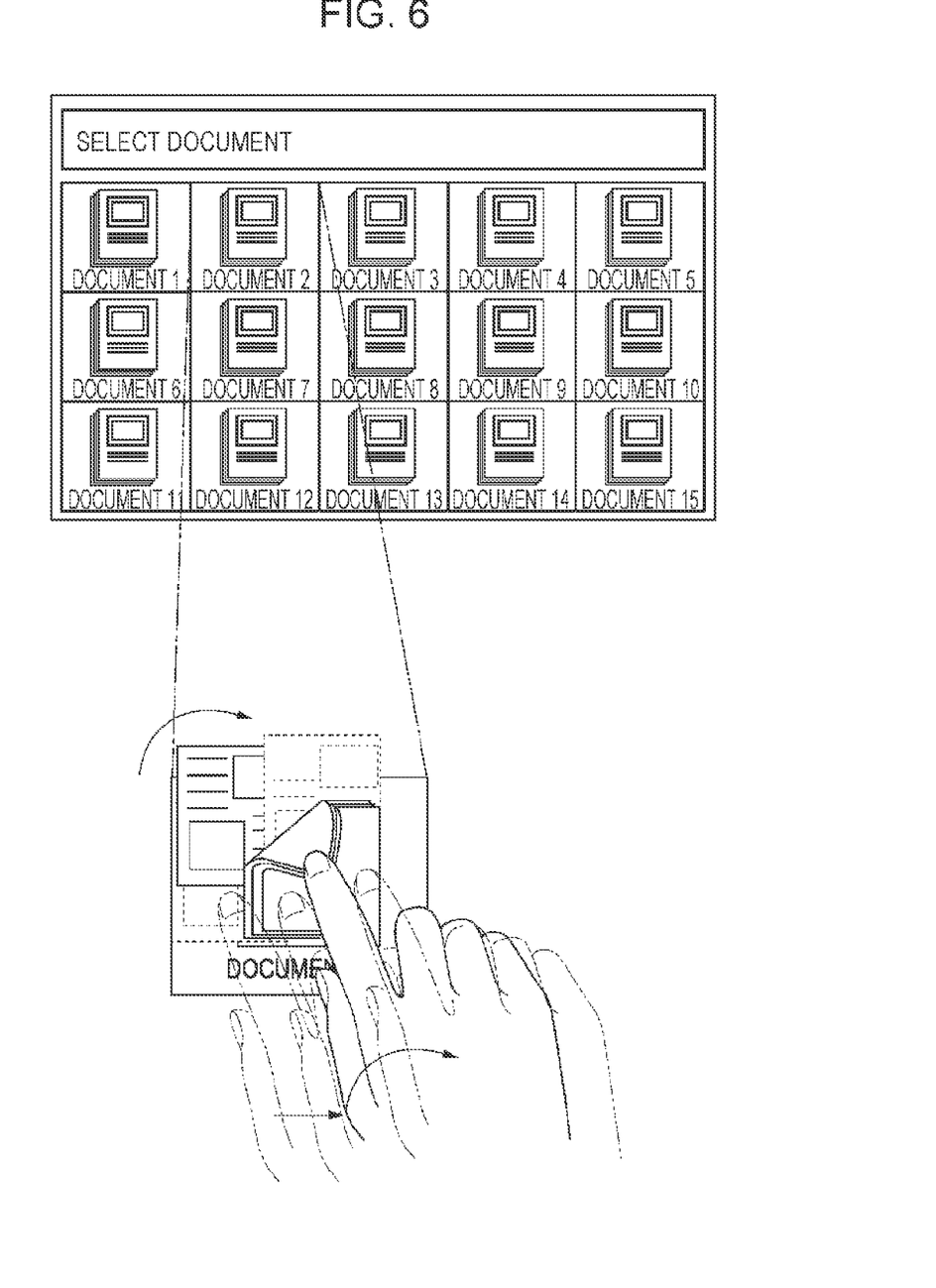
FIG. 6 is a diagram illustrating an example of follow-up shift in page switching control according to Exemplary Embodiment 3.

As illustrated in FIG. 6, the position where the thumbnail image of the page to be displayed may be made to vary so as to follow an another sliding operation that is performed after page switching control is started. That is, for example, in the case of a rightward sliding operation that is performed when a left edge of the thumbnail image is in a touched state, the thumbnail image to be displayed is displayed in a position shifted leftward from the original position. After that, if a downward sliding operation of the thumbnail image is further performed, the thumbnail image to be displayed is displayed in a position shifted upward from the original position. With regard to the shifting direction of the thumbnail image, the direction of the touch position after the sliding operation with respect to the center position of the thumbnail image may be identified such that the shifting direction of the thumbnail image may be set to the direction opposite to the identified direction, for example.

Figure 7:
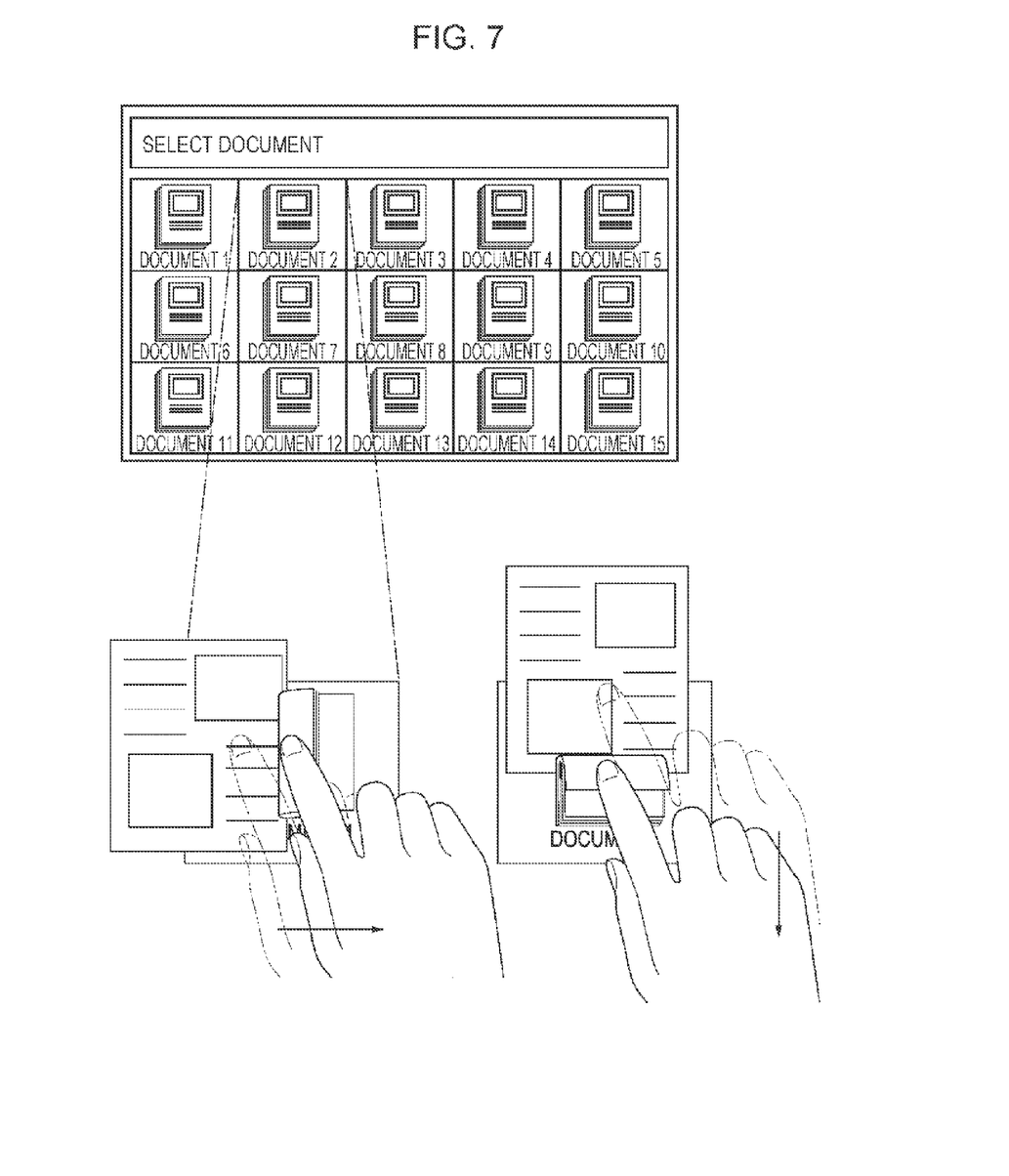
FIG. 7 is a diagram illustrating examples of enlarged display in page switching control according to Exemplary Embodiment 3.

Further, as illustrated in FIG. 7, the thumbnail image of the page to be displayed may be displayed in an enlarged manner (e.g., two times in width and height). It is to be noted the thumbnail image may be enlarged to any size, and the scale factor may be determined by taking the size of the display panel 1 and the like into consideration. Further, enlarged display of the thumbnail image may not be automatically performed, and may be performed in response to an instruction from the user (e.g., pressing of a predetermined key (the shift key or control key)).

(Exemplary Embodiment 4)

Exemplary Embodiment 4 is an extended example of Exemplary Embodiment 2 (or Exemplary Embodiment 3). In Exemplary Embodiment 4, the page contents of plural documents are compared with each other while performing page switching control of the thumbnail images with respect to the plural documents. In the following, a description of features that are the same as those in Exemplary Embodiment 2 (or Exemplary Embodiment 3) will be omitted, and only the differences will be described.

Figure 8:
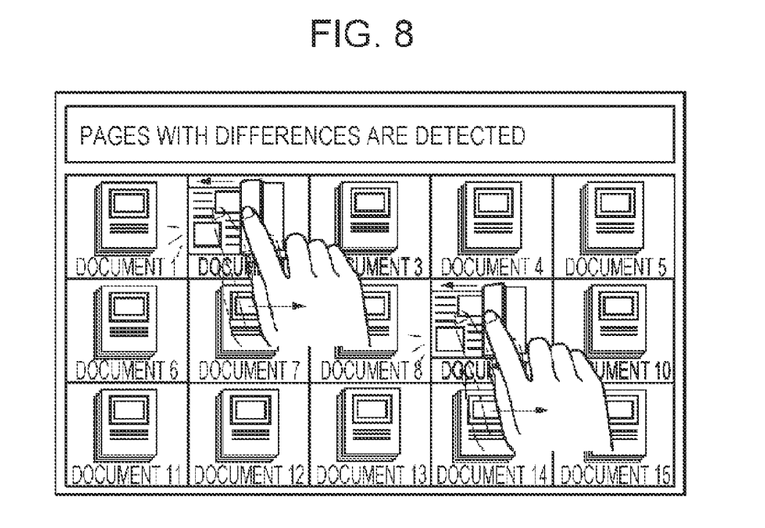
FIG. 8 is a diagram illustrating an example of page comparison in page switching control according to Exemplary Embodiment 4.

FIG. 8 illustrates an example of page comparison in page switching control according to Exemplary Embodiment 4.

In Exemplary Embodiment 4, the operation detecting unit 5 detects plural touch operations on the touch panel 2. In response to detection of, on thumbnail images of plural documents, sliding operations which are performed at the time the thumbnail images are in a touched state and in which sliding distances are equal to or greater than a threshold, the page switching controller 6 performs page switching control with respect to these plural documents. At this point, the page switching controller 6 compares the thumbnail images of the respective documents with each other. The page switching controller 6 continues page switching control if the thumbnail images are identical to each other, and stops page switching control if the thumbnail images are not identical to each other. That is, the thumbnail images of each of the plural documents are switched sequentially, and page switching is stopped when pages that are different from each other are detected.

Figure 9:
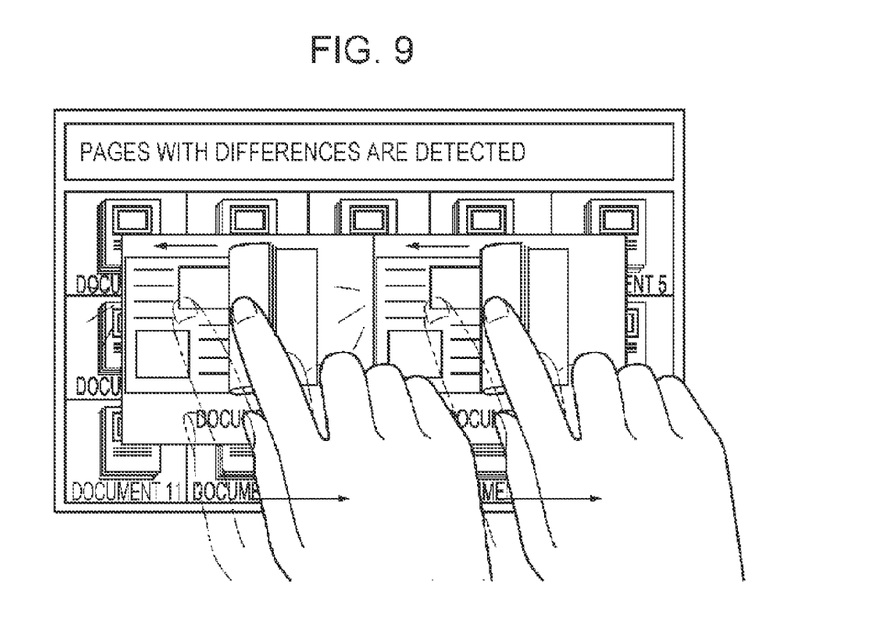
FIG. 9 is a diagram illustrating an example of different page detection in page switching control according to Exemplary Embodiment 4.

As illustrated in FIG. 9, in the case where page switching control is stopped due to the thumbnail images of the respective documents not being identical to each other, the thumbnail images of the respective documents at the time point where the page switching control is stopped may be displayed in an enlarged manner.

Alternatively, during execution of page switching control on the thumbnail images of the plural documents, the thumbnail images of the respective documents may always be displayed in an enlarged manner.

As described above with Exemplary Embodiments 1 through 4, the thumbnail display apparatus according to the present exemplary embodiment includes the thumbnail display unit 4 that displays on the display panel 1, one by one, thumbnail images which correspond to plural pages included in a document and are generated by reducing images of the corresponding pages included in the document to a predetermined size; the operation detecting unit 5 that detects a sliding operation which is performed when the thumbnail image displayed on the display panel 1 is in a touched state, on the basis of a signal of a touch position that is output from the touch panel 2 disposed on the display panel 1; and the page switching controller 6 that performs, in response to detection of the sliding operation by the operation detecting unit 5, page switching control so as to sequentially switch the page of the document whose thumbnail image is to be displayed by the thumbnail display unit 4 to the other pages.

The thumbnail display apparatus according to the present exemplary embodiment includes a computer that has hardware resources such as a central processing unit (CPU) that performs various arithmetic operations; a primary storage device such as a random access memory (RAM) serving as a work area of the CPU and a read only memory (ROM) storing a basic control program or the like; a secondary storage device storing various programs and data; an input-output interface serving as an interface with output devices such as a display panel for displaying various types of information, and with input devices such as operation buttons and a touch panel used for input operations by the user; and a communication interface that performs wired or wireless communication with other devices.

A program according to an exemplary embodiment of the present invention is read from the secondary storage device so as to be loaded to the RAM, and the program is executed by the CPU. Thus, the functions of the thumbnail display apparatus according to the exemplary embodiment of the present invention are realized on the computer.

That is, the function of a display according to an exemplary embodiment of the present invention is implemented as the thumbnail display unit 4; the function of a detecting unit according to the exemplary embodiment of the present invention is implemented as the operation detecting unit 5; and the function of a controller according to the exemplary embodiment of the present invention is implemented as the page switching controller 6.

These functional units may not be implemented with the software configuration of this exemplary embodiment, and may be implemented as respective dedicated hardware modules.

Although the thumbnail display apparatus provided in a multifunction machine is illustrated in the above description, the present invention is not limited to the above described exemplary embodiments, and may be implemented as a thumbnail display apparatus to be provided in various types of apparatuses.

Further, in the above description, pages are switched in the order from the first page to the last page. However, contrary to this, pages may be switched in the order from the last page to the first page. Further, during execution of the page switching, the order in which the pages are switched may be reversed in response to an instruction from the user (e.g., pressing of a predetermined key (the shift key or control key)).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
    a display configured to display, one by one, images corresponding to a plurality of pages included in a document;
    a detecting unit configured to detect, while the image displayed by the display is being touched by an object, a sliding operation of the object into an area outside the image displayed by the display; and
    a controller configured to perform, while the image is being displayed and in response to the detecting unit detecting the sliding operation, page switching so as to sequentially switch the page of the document whose image is being displayed by the display to other pages,
    wherein the image of the page to be displayed is displayed in a position shifted in a direction opposite to a direction of the sliding operation.

2. The display apparatus according to claim 1, wherein the detecting unit detects whether a sliding distance of the object is equal to or greater than a threshold in order to detect the sliding operation.

3. The display apparatus according to claim 1, wherein a time interval of page switching in the page switching control varies in accordance with a sliding distance of object.

4. The display apparatus according to claim 1, wherein, while the page switching is performed, the display displays a part of or the entire image of the page to be displayed and the image of the page preceding the page to be displayed, the image of the preceding page being displayed in a manner such that a part of the preceding page is folded back.

5. The display apparatus according to claim 4, wherein the image of the preceding page is displayed in a state in which an image portion thereof in a direction opposite to a direction of the sliding operation is folded back in the direction of the sliding operation.

6. The display apparatus according to claim 1, wherein a position where the image of the page to be displayed is displayed varies so as to follow another sliding operation which is performed after the page switching is started.

7. The display apparatus according to claim 1, wherein the image of the page to be displayed is enlarged.

8. The display apparatus according to claim 1,
    wherein the detecting unit is configured to detect sliding operations on images of a plurality of documents; and
    wherein the controller is configured to perform, in response to the detecting unit detecting the sliding operations on the images of the plurality of documents, page switching of the images with respect to the plurality of documents, to continue the page switching in response to the images of respective documents being identical to each other, and to stop the page switching in response to the images of the respective documents not being identical to each other.

9. The display apparatus according to claim 8, wherein the display displays, in response to the page switching being stopped due to the images of the respective documents not being identical to each other, the images of the respective documents at a time point where the page switching is stopped are enlarged.

10. The display apparatus according to claim 1,
    wherein the display is further configured to display, one by one, images corresponding to a plurality of pages included in a second document while also displaying, one by one, the images corresponding to the plurality of pages included in the document,
    wherein the detecting unit is further configured to detect, while the images of the second document are being displayed, a second sliding operation,
    in response to the sliding operation and the second sliding operation being detected together and a displayed image of the document matching a displayed image of the second document, the controller performs page switching of the images of the document and the second document, and
    in response to the sliding operation and the second sliding operation being detected together and the displayed image of the document not matching the displayed image of the second document, the controller stops the page switching of the images of the document and the second document.

11. The display apparatus according to claim 10, wherein in response to the controller stopping the page switching of the images of the document and the second document, the images of the respective documents are displayed in an enlarged manner.

12. The display apparatus according to claim 1, the display is a touchscreen display, and the detecting unit is configured to detect the object contacting the touchscreen display.

13. The display apparatus according to claim 1, wherein in response to the object touching the image for a time T or longer, the display apparatus shifts into a preview mode in which a first region outside the image is set to a region for issuing an instruction for starting page switching control.

14. The display apparatus according to claim 13, in response to the display apparatus shifting into the preview mode, a region inside the displayed image is set as a region for issuing an instruction for stopping page switching control.

15. A display method comprising:
- displaying, one by one, images corresponding to a plurality of pages included in a document, the images being generated by reducing images of the corresponding pages included in the document to a predetermined size;
- detecting, while the image is being displayed and touched by an object, a sliding operation of the object into an area outside the image displayed by the display; and
- performing, in response to detecting the sliding operation, page switching so as to sequentially switch the page of the document whose image is being displayed in the displaying to other pages,
- wherein the image of the page to be displayed is displayed in a position shifted in a direction opposite to a direction of the sliding operation.

16. A non-transitory computer readable medium storing a program causing a computer to execute a display process, the process comprising:
- displaying, one by one, images corresponding to a plurality of pages included in a document, the images being generated by reducing images of the corresponding pages included in the document to a predetermined size;
- detecting, while the image is being displayed and touched by an object, a sliding operation of the object into an area outside the image displayed by the display; and
- performing, in response to detecting the sliding operation, page switching so as to sequentially switch the page of the document whose image is being displayed in the displaying to other pages,
- wherein the image of the page to be displayed is displayed in a position shifted in a direction opposite to a direction of the sliding operation.

* * * * *